United States Patent
Shimoda et al.

(10) Patent No.: US 6,585,794 B2
(45) Date of Patent: Jul. 1, 2003

(54) NONWOVEN METAL FABRIC AND METHOD OF MAKING SAME

(75) Inventors: Kohei Shimoda, Itami (JP); Toshiyasu Tsubouchi, Itami (JP)

(73) Assignee: Sumitomo Electric Industries, Ltd., Osaka (JP)

(*) Notice: Subject to any disclaimer, the term of this patent is extended or adjusted under 35 U.S.C. 154(b) by 98 days.

(21) Appl. No.: 09/983,872

(22) Filed: Oct. 26, 2001

(65) Prior Publication Data
US 2002/0078669 A1 Jun. 27, 2002

(30) Foreign Application Priority Data
Nov. 7, 2000 (JP) .......................... 2000-338928

(51) Int. Cl.[7] ................................. B32B 5/18
(52) U.S. Cl. ..................... 55/527; 55/385.3; 55/522; 55/DIG. 5; 264/DIG. 48; 123/198 E; 210/500.25; 428/608; 428/613; 442/117; 442/376; 442/377; 442/378; 442/379
(58) Field of Search .............. 55/522, 525, 527, 55/528, DIG. 5, 385.3; 264/DIG. 48; 210/500.25; 428/608, 613; 123/198 E; 442/117, 376, 377, 378, 379

(56) References Cited

U.S. PATENT DOCUMENTS

| | | | |
|---|---|---|---|
| 3,127,668 A | 4/1964 | Troy | |
| 3,469,297 A | 9/1969 | Webber | |
| 3,695,869 A * | 10/1972 | Hisert et al. | 419/2 |
| 5,352,517 A * | 10/1994 | Clough et al. | 428/357 |
| 5,665,479 A | 9/1997 | Vandamme et al. | |
| 5,725,750 A * | 3/1998 | Tsubouchi et al. | 205/75 |
| 6,010,604 A * | 1/2000 | Stauffer | 204/242 |
| 6,171,684 B1 * | 1/2001 | Kahlbaugh et al. | 428/212 |
| 6,409,785 B1 * | 6/2002 | Smithies et al. | 55/486 |
| 6,485,811 B1 * | 11/2002 | Horiguchi et al. | 428/181 |

FOREIGN PATENT DOCUMENTS

| | | |
|---|---|---|
| EP | 0404961 A1 | 1/1991 |
| EP | 0957241 A2 | 11/1999 |
| EP | 1052321 A1 | 11/2000 |
| JP | 4-11058 | 1/1992 |
| JP | 5-305207 | 11/1993 |
| JP | 10-176519 | 6/1998 |
| JP | 2000-129311 | 5/2000 |
| WO | WO 01/28668 | 4/2001 |

* cited by examiner

*Primary Examiner*—Duane Smith
*Assistant Examiner*—Minh Chau Thi Pham
(74) *Attorney, Agent, or Firm*—McDermott, Will & Emery

(57) ABSTRACT

The present invention provides a nonwoven metal fabric for various uses, such as a filter used for purification of exhaust gas from automobiles or semiconductor manufacturing gas, a catalyst carrier of fuel cell, and so forth, in which the corrosion resistance is improved without compromising the property in terms of pressure loss. The nonwoven metal fabric of the present invention is formed with the metal fibers wherein the relation of the fiber diameter Da at the surface part of the gas inlet side and the fiber diameter Db at the central part of the thickness direction is expressed as the equation $Da \geq 1.5 \times Db$ and the fiber diameter Da at the surface part of the gas inlet side is not less than 15 $\mu$m and not more than 60 $\mu$m.

7 Claims, 1 Drawing Sheet

NONWOVEN METAL FABRIC AND METHOD OF MAKING SAME

BACKGROUND OF THE INVENTION

The present invention relates to a nonwoven metal fabric for use in various kinds of filters for purification for exhaust gas from automobiles and semiconductor manufacturing gas and catalyst carrier of fuel cell and so forth.

The nonwoven metal fabric is often used for the materials for filters because of its superior strength and heat-resistance and low pressure-loss. For example, it is used for a diesel particulate filter (DPF) that reduces particulates such as soot in the exhaust gas which creates social problems of air pollution by the exhaust gases of automobiles.

The nonwoven metal fabric is also used for the filters to remove particles in manufacturing gases in the semiconductor manufacturing processes.

The exhaust gas from a diesel engine and gases emitted in the semiconductor manufacturing processes or a part of the exhaust gases from fuel cells contain corrosive gases. It is therefor an object to improve the corrosion resistance of the nonwoven metal fabric as the nonwoven metal fabric corrodes in the corrosive gas.

A large diameter of metal fiber of the nonwoven metal fabric has been considered as a means of improving the corrosion resistance of the nonwoven metal fabric. The drawback, however, is the reduced performance of pressure loss of the filter and the catalyst carrier if the metal fiber diameter is enlarged.

On the contrary, the object of the present invention is to provide the nonwoven metal fabric that has the improved corrosion resistance without compromising the performance of pressure loss and its preparing method.

SUMMARY OF THE INVENTION

According to one aspect of the present invention, the corrosion resistance of a nonwoven metal fabric formed with mainly metal fibers can be improved without compromising its property in terms of pressure loss by making the fiber diameter Da at the surface part of the gas inlet side and the fiber diameter Db at the central part of the thickness direction to satisfy the equation Da≧1.5×Db, wherein the fiber diameter Da is not less than 15 μm and not more than 60 μm. Here, the metal fiber diameter is measured with a scanning electron microscope (SEM).

In the case where the fiber diameter Da at the surface part of the gas inlet side is smaller than 1.5 times the fiber diameter Db at the central part of the thickness direction, the fiber diameters must be made large in the whole nonwoven metal fabric to improve the corrosion resistance of the fabric. However, if the fiber diameter in the whole nonwoven metal fabric is enlarged, the performance of the cloth in terms of the pressure loss declines. Therefore, in order to avoid such degradation of pressure loss paformance, it is necessary for the fiber diameter of the nonwoven metal fabric to satisfy the relationship Da≧1.5×Db.

Also, when the fiber diameter Da at the surface part of the gas inlet side is made smaller than 15 μm, the smaller the diameter of metallic fibers, the more corrosion occurs at the surface part. This is because the inertia force of the gas flow becomes the highest at the surface of the nonwoven metal fabric when the corrosive gas passes the nonwoven metal fabric.

It is more preferable to have a large diameter fiber Da at the surface part of the metal unwoven fiber to improve the corrosion resistance of the nonwoven metal fabric. The larger the fiber diameter Da becomes, however, the greater the pressure loss when gas and so on pass the nonwoven metal fabric. Accordingly it is necessary that the fiber diameter at the surface part of the nonwoven metal fabric be not more than 60 μm.

Also it is preferable that the fiber diameter Db at the central part of the nonwoven metal fabric be not more than 35 μm. If the fiber diameter Db at the central part of the nonwoven metal fabric is more than 35 μm, it becomes disadvantageous in that the pressure loss increases as in the case with the fiber diameter Da at the surface part.

Also it is preferable that the fiber diameter Dc at the surface part of the gas outlet side satisfies the relation of Dc≧1.5×Db and is not more than 60 μm. This is because it is possible to manufacture and use the nonwoven metal fabric without distinguishing the front and back and reduce costs to distinguish them. The fiber diameter Dc at the surface part of the gas outlet side, however, is not limited to this condition because of a small effect of the corrosion. On the contrary, if the fiber diameter Dc at the surface part of the gas outlet side is made small, the pressure loss is restrained.

FIG. 1 shows a conceptual figure of the nonwoven metal fabric according to one aspect of the present invention. The diameter of the metal fiber 2a and the diameter of the metal fiber 2b of the nonwoven metal fabric 1 change along the gas flow direction, which is the thickness direction, when the filter surface 3 is perpendicular to the gas flow direction A. The fiber diameter 2a at the surface part of the gas inlet side is made to be different from the fiber diameter 2b at the central part of thickness direction by adjusting the maximum current density of the electroplating and metal composition of the plating bath, which is described in the following. The fiber diameter 2c at the surface part of the gas outlet side is nearly the same as the fiber diameter 2a at the surface part of the gas inlet side in FIG. 1. It is possible, however, to make the fiber diameter 2c smaller than the fiber diameter 2a by making the maximum current density at the surface part of the gas outlet side smaller than at the surface part of the gas inlet side.

FIG. 2 shows a conceptual figure of an example of the nonwoven metal fabric of the present invention. The diameter of the metal fiber 2a and the diameter of the metal fiber 2b of the nonwoven metal fabric 1 change along the gas flow direction, which is the thickness direction, when the filter surface 4 is perpendicular to the gas flow direction A. The nonwoven metal fabric in FIG. 2 differs from FIG. 1 in that a sheet of the nonwoven metal fabric 1 is made by piling up the nonwoven metal fabrics 1a and 1b which have different metal fiber diameters from each other in FIG. 2. The difference between the fiber diameter 2a at the surface part at the gas inlet side and the fiber diameter 2b at the central part of the thickness direction can be easily adjusted by such structure. Also, the number of nonwoven metal fabrics can be equal to or more than three sheets if the relation of a fiber diameter Da at the surface part of the gas inlet side and a fiber diameter Db at the central part of the thickness direction satisfies the equation Da≧1.5×Db and the fiber diameter Da at the surface part of the gas inlet side is not less than 15 μm and not more than 60 μm, despite the structure in FIG. 2 consisting of 2 sheets of the nonwoven metal fabric.

It is desirable that the cross section of the metal fiber is not angular, and is close to circle or ellipse. This is because the corrosion originate from an angular part of the metal fiber if the cross section of the metal fiber is angular. Assessment of an angular cross section is made by a scanning electron microscope (SEM) having an expansion magnification of from about 200 times to about 1000 times.

For low production cost of the nonwoven metal fabric it is desirable that the main composition of the metal fiber is Fe or Ni, or both Fe and Ni and the metal fiber is a solid solution alloy or another alloy of these elements. The effect of corrosion resistance is not diminished if the total amount of metallic additive elements added to increase the corrosion resistance such as Al, Ag, Si Ti, V, Cr, Co, Zr, Nb, Mo, or rare-earth metallic elements is not more than 40 weight percent.

The nonwoven metal fabric is prepared by a method in which a conductive nonwoven fabric is electroplated with metal on the surface of the nonwoven metal fabric, and is fired in a reducing atmosphere, and the conductive nonwoven fabric is removed.

It is desirable that the maximum current density of the electroplating is not less than 10 A/dm$^2$. In the case that the maximum current density of the electroplating is less than 10 A/dm$^2$, the deposition speed of the plating decreases and too many ions of Fe or Ni alloys diffuse to the central part of the thickness direction of the nonwoven metal fabric. As a result, it becomes difficult to make the diameter large at only the surface part of the metal fiber. If the maximum current density of the electroplating is not less than 10 A/dm$^2$, the plating time on the conductive cloth can be shortened and the manufacturing cost reduced.

Also, it is desirable that the metal concentration in the plate bath during electroplating is not more than 120 g/L. In the case that the metal concentration in the plate bath during electroplating is more than 120 g/L, the central part of the thickness direction of the nonwoven metal fabric is plated excessively. And the difference in the fiber diameter of the surface part and the central part of the nonwoven metal fabric becomes small even if the diffusion speed of Fe or Ni alloy is small.

Fe salt or Ni salt dissolved in the plating bath is not particularly limited. In the case of Fe salt, any conventional soluble Fe salt which valence number is 2 can be used. Examples of such Fe salt are ferrous sulfate, ferrous chloride, and ferrous sulfamate. They can be used independently or combined suitably. As for the amount of dissolution, it is desirably from 1 g/L to 120 g/L by Fe part conversion. It is more desirably from 30 g/L to 100 g/L from the viewpoint of efficient plating.

In the case of Ni salt, soluble Ni salt can be used. Examples of such Ni salt are nickel sulfate, nickel chloride, nickel acetate, nickel nitrate, nickel sulfamate, nickel carbonate, nickel methanesulfonate, and so on. They can be used independently or combined suitably. As for the amount of dissolution, it is desirably from 1 g/L to 120 g/L by Ni part conversion. It is more desirably from 30 g/L to 100 g/L from the viewpoint of efficient plating. In addition, prior to electroplating, the conductive nonwoven fabric may be subjected to well-known pre-treatment, such as degreasing, bubble removal, and immersing in the pickling acid. Moreover, conventional post-plating treatment such as water washing, warm water washing, and drying may be performed.

It is desirable that the cross section of the fiber of the conductive metal cloth is close to circle or ellipse. The crosssection of the metal fiber does not have an angular part if the cross section of the metal fiber of the conductive metal cloth is close to circle or ellipse. As a result, the corrosion resistance of the metal fiber can be improved.

The thickness of the conductive nonwoven fabric is desirably not less than 0.3 mm, and more desirably not less than 0.5 mm. Otherwise, it becomes difficult to produce a difference in the electric deposition speed at the surface part and the central part of the thickness direction of the conductive nonwoven fabric. Consequently, the difference in the diameter of the fiber at the surface part and the central part of the thickness direction of a nonwoven metal fabric becomes small.

As for the conductive nonwoven fabric, it is desirable that it is a carbon nonwoven fabric or an organic fiber nonwoven fabric in which the fiber surface is treated to have electrical conductivity.

The carbon nonwoven fabric may be made by processing carbon fibers into an nonwoven fabric by a well-known process, such as the dry process or wet process. Particularly, the carbon nonwoven fabric by the wet process can be used suitably. Moreover, in the processes making the nonwoven fabric, organic binders, such as polyester, polyurethane, polyvinyl alcohol, epoxy, and polyimide may be included to 50% of the weight as occasion demands. As for carbon fibers, well-known carbon fibers, such as a PAN system and a pitch system which are easily obtainable, can be used.

Well known fibers such as polyester, polypropylene, polyolefin, nylon can be used as a material of the organic fiber nonwoven fabric. The organic fiber nonwoven fabric made by well-known methods such as needle-punch method, spun lace method, melt blow method can be used.

Preferably, a carbon unwoven fabric may be made by heat-treating the carbon fibers fixed each other with a resin and thereby carbonizing the resin so as to have conductivity.

Coating of a conductive substance, electroless plating of nickel etc. can be used to give conductivity on the surface of a fiber. It is desirable that the thickness of the electric conductive layer is 10 $\mu$m or less, and it is more desirable that it is 0.1 $\mu$m or more, and 1 $\mu$m or less. This is because cracks and exfoliation at the electric conductive layer occur easily, as the stress generated in the electric conductive layer will become large if the thickness of the electric conductive layer is too large. Conversely, if the thickness of the electric conductive layer is too thin, plating to the fiber surface will become difficult.

DETAILED DESCRIPTION OF THE INVENTION

EXAMPLE 1

Figure 1:
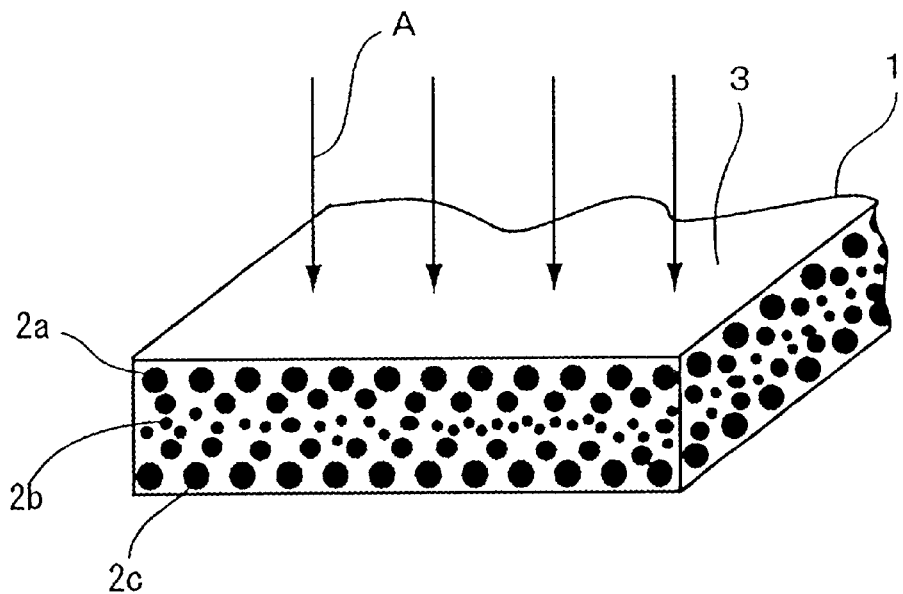
FIG. 1 is a conceptual figure showing an example of the nonwoven metal fabric of the present invention.
Figure 2:
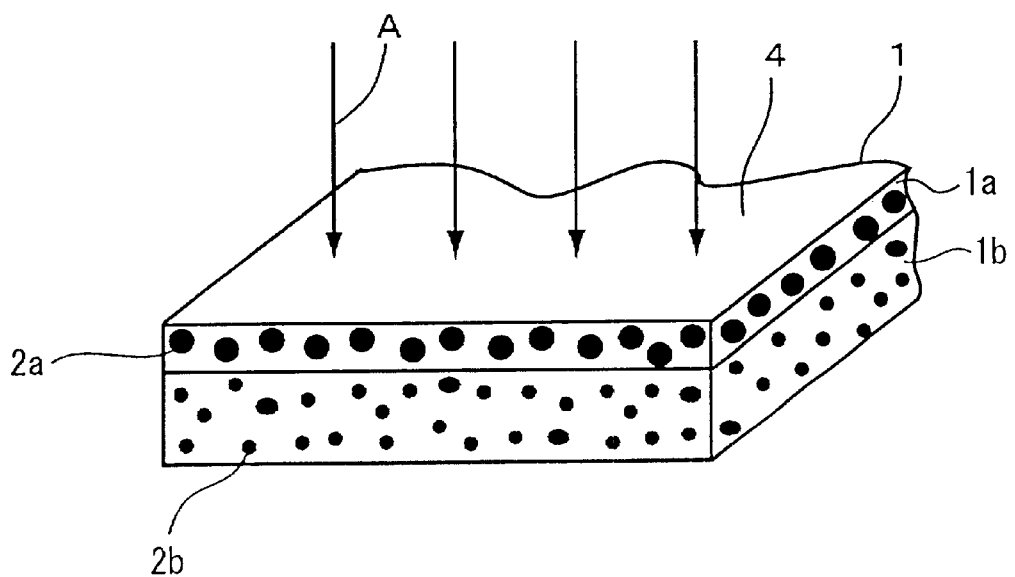
FIG. 2 is a conceptual figure showing an example of an embodiment of the nonwoven metal fabric of the present invention.

PAN system carbon fiber with a circular cross-section form was used, and the carbon nonwoven fabric with a thickness of 0.6 mm which contains an organic binder of 15% by weight was made. After a pretreatment of this carbon nonwoven fabric by a well-known method, Fe plating was performed by the electroplating method using plating bath whose main ingredient was ferrous chloride. Fe ion concentration and the maximum current density of electroplating in Fe plating were as given in Table 1. Firing and removal of the carbon nonwoven fabric were performed in a hydrogen and nitrogen atmosphere after plating, and the Fe nonwoven fabric was produced. Furthermore, alloying processing of the powder pack method was performed, and this iron nonwoven fabric was made into the Fe-20 wt % Cr-5 wt % Al nonwoven fabric. As a result of measuring the cross-sectional form and the diameter of the metal fibers of this nonwoven fabric by the scanning electron microscope (SEM), the cross-sectional form was round or ellipse, and the diameter of the fibers was as is shown in Table 1. Here, the diameter of each fiber was the mean size of the diameter of the maximum, and the diameter of the minimum. The measurement of 30 fibers respectively of the surface part at the gas inlet side, and the central part of the thickness direction was performed, and the diameter shown in Table 1 is the average value.

Dry air was penetrated through the nonwoven metal fabric at the rate of 10 NL/(min. and $cm^2$), and the pressure loss at the time of an air penetration was measured. Furthermore, air which contains $NO_2$ gas of 20 ppm, $SO_2$ gas of 10 ppm, and moisture of 6% is heated at 350° C., and penetrated at the rate of 10 NL/(min.·$cm^2$) for 100 hrs through the nonwoven metal fabric, and corrosion-resistant evaluation was carried out. The existence of corrosion was investigated by metallurgical microscopic observation after the corrosion-resistant evaluation examination. The above evaluation result is shown in Table 1.

thickness of 0.8 mm which contains an organic binder of 20 weight % was made. After the pretreatment of this carbon nonwoven fabric by a well-known method, Ni plating was performed by the electroplating method using plating bath whose main ingredient was nickel sulfate. Ni ion concentration and the maximum current density of electroplating in Ni plating were as given in Table 2.

Firing and removal of the carbon nonwoven fabric were performed in a hydrogen and nitrogen atmosphere after plating, and the Ni nonwoven fabric was produced. Furthermore, alloying processing of the powder pack method was performed, and this Ni nonwoven fabric was made into the Ni-25 wt % Cr-8 wt % Al nonwoven fabric. As a result of measuring the cross-sectional form and the diameter of the metal fibers of this nonwoven fabric by the same method as Example 1, the cross-sectional form was circular or elliptical, and the diameter of the fibers was as is shown in Table 2.

TABLE 1

| Sample No. | Fe ion Concentration g/L | Maximum Current Density A/$dm^2$ | Fiber Diameter at Surface Part of Nonwoven metal fabric (Da) μm | Fiber Diameter at Central Part of Nonwoven metal fabric (Db) μm | Da/Db | Corrosion Resistant Evaluation | Pressure Loss kPa |
|---|---|---|---|---|---|---|---|
| 1 | 40 | 3 | 15 | 15 | 1.00 | Overall Corrosion | 0.69 |
| 2 | 50 | 10 | 18 | 12 | 1.50 | No Corrosion | 0.72 |
| 3 | 60 | 30 | 24 | 10 | 2.40 | No Corrosion | 0.63 |
| 4 | 75 | 20 | 33 | 20 | 1.65 | No Corrosion | 0.40 |
| 5 | 90 | 30 | 56 | 34 | 1.65 | No Corrosion | 0.67 |
| 6 | 130 | 25 | 68 | 36 | 1.89 | No Corrosion | 1.24 |

The evaluation results show that the nonwoven metal fabrics exhibit excellent corrosion resistance and low-pressure power loss in the case where the relation of a fiber diameter Da at the surface part of the gas inlet side and a Furthermore, pressure loss and corrosion-resistant evaluation of the nonwoven metal fabric were carried out by the method indicated in Example 1. The above evaluation result is shown in Table 2.

TABLE 2

| Sample No. | Ni Concentration g/L | Maximum Current Density A/$dm^2$ | Fiber Diameter at Surface Part of Nonwoven metal fabric (Da) μm | Fiber Diameter at Central Part of Nonwoven metal fabric (Db) μm | Da/Db | Corrosion Resistant Evaluation | Pressure Loss kPa |
|---|---|---|---|---|---|---|---|
| 7 | 35 | 3 | 18 | 18 | 1.00 | Overall Corrosion | 0.63 |
| 8 | 50 | 25 | 30 | 12 | 2.50 | No Corrosion | 0.46 |
| 9 | 60 | 25 | 35 | 16 | 2.19 | No Corrosion | 0.42 |
| 10 | 80 | 20 | 48 | 28 | 1.71 | No Corrosion | 0.43 |
| 11 | 100 | 30 | 54 | 30 | 1.80 | No Corrosion | 0.58 |
| 12 | 130 | 35 | 65 | 40 | 1.63 | No Corrosion | 1.13 | fiber diameter Db at the central part of the thickness direction satisfies the equation Da≧1.5×Db, and the fiber diameter Da at the surface part of the gas inlet side is not less than 15 μm and not more than 60 μm.

EXAMPLE 2

Pitch system carbon fiber with a cross-section of a circular form was used, and the carbon nonwoven fabric with a The evaluation results show that the nonwoven metal fabric in which the relation of a fiber diameter Da at the surface part of the gas inlet side and a fiber diameter Db at the central part of the thickness direction satisfied the equation Da≧1.5×Db, and whose fiber diameter Da at the surface part of the gas inlet side was not less than 15 μm and not more than 60 μm was excellent in corrosion resistance, and low-pressure power loss.

EXAMPLE 3

An organic fiber nonwoven fabric with a thickness of 1.5 mm was prepared. The organic fiber nonwoven fabric was made from polyester fiber of 20 μm diameter by the spun lace method. The cross-sectional form of the polyester fiber was circular. After a pretreatment for the polyester nonwoven fabric by a well-known method, Ni plating was performed by the electroless plating method. The average thickness of the plated layer was 0.8 μm. Furthermore, Ni plating was performed by the electroplating method using a plating bath whose main ingredient was nickel sulfamate. Ni ion concentration and the maximum current density of electroplating in Ni plating were as given in Table 3.

Firing and removal of the carbon nonwoven fabric were performed in hydrogen and nitrogen atmosphere after plating, and the Ni nonwoven fabric was produced. Furthermore, alloying processing of the powder pack method was performed, and this Ni nonwoven fabric was made into the Ni-20 wt % Cr-3 wt % Al-1 wt % Ti nonwoven fabric. As a result of measuring the cross-sectional form and the diameter of the metal fibers of this nonwoven fabric by the same method as example 1, the cross-sectional form was circular or elliptical, and the diameter of the fibers was as is shown in Table 3.

EXAMPLE 4

A nonwoven metal fabric consisting of SUS304 metal fiber made by the wire cutting method was prepared. The cross-sectional form of a metal fiber had a polygon shape, such as a quadrangle. As a result of measuring the diameter of the metal fibers by the same method as example 1, both diameters of the fibers of the surface part of the nonwoven metal fabric and the central part of the thickness direction were 40 μm.

This nonwoven metal fabric and a nonwoven metal fabric described in Comparative example 1 were laminated. The nonwoven metal fabric having a fiber diameter of 40 μm was positioned at the gas inlet side, and the pressure loss and corrosion resistance were evaluated by the method described in Example 1. The results showed that the pressure loss was 0.71 kPa, which is acceptable, but corrosion occurred partially around the corners of the metallic fibers.

What is claimed is:

1. A nonwoven metal fabric formed with mainly metal fibers, wherein:

the fiber diameter Da at the surface part of the gas inlet side and the fiber diameter Db at the central part of the thickness direction satisfy the equation $Da \geq 1.5 \times Db$;

TABLE 3

| Sample No. | Ni Concentration g/L | Maximum Current Density A/dm$^2$ | Fiber Diameter at Surface Part of Nonwoven metal fabric (Da) μm | Fiber Diameter at Central Part of Nonwoven metal fabric (Db) μm | Da/Db | Corrosion Resistant Evaluation | Pressure Loss kPa |
|---|---|---|---|---|---|---|---|
| 13* | 35 | 5 | 25 | 18 | 1.39 | Overall Corrosion | 0.39 |
| 14 | 40 | 15 | 30 | 13 | 2.31 | No Corrosion | 0.32 |
| 15 | 60 | 20 | 36 | 18 | 2.00 | No Corrosion | 0.33 |
| 16 | 80 | 25 | 44 | 24 | 1.83 | No Corrosion | 0.26 |
| 17 | 100 | 25 | 58 | 37 | 1.57 | No Corrosion | 0.80 |
| 18* | 130 | 45 | 72 | 35 | 2.06 | No Corrosion | 1.09 |

Results of the evaluation show that the nonwoven metal fabric in which the relation of a fiber diameter Da at the surface part of the gas inlet side and a fiber diameter Db at the central part of the thickness direction satisfied the equation $Da \geq 1.5 \times Db$, and whose fiber diameter Da at the surface part of the gas inlet side was not less than 15 μm and not more than 60 μm was excellent in corrosion resistance and low-pressure power loss. It is more desirable that the fiber diameter Db at the central part of the thickness direction of the nonwoven metal fabric is not more than 35 μm as the pressure loss becomes smaller.

Comparative Example 1

A nonwoven metal fabric consisting of SUS304 metal fiber made by the wire cutting method was prepared. The cross-sectional form of a metal fiber had a polygon shape, such as a quadrangle. As a result of measuring the diameter of the metal fiber by the same method as example 1, both diameters of the fibers of the surface part of the nonwoven metal fabric and the central part of the thickness direction were 10 μm.

Pressure loss and corrosion-resistance evaluation of the nonwoven metal fabric were carried out by the method indicated in Example 1. Consequently, although pressure losses were 0.50 kPa and it was estimated to be good at this point, corrosion occurred in the overall nonwoven metal fabric, and the problem was due to corrosion resistance.

and the fiber diameter Da at the surface part of the gas inlet side is not less than 15 μm and not more than 60 μm.

2. A nonwoven metal fabric according to claim 1, wherein the fiber diameter Db at the central part of the thickness direction is not less than 35 μm.

3. A nonwoven metal fabric according to claim 1, wherein the cross-section of the metal fiber is not angular.

4. A nonwoven metal fabric according to claim 1, wherein the main composition of the metal fiber is Fe or Ni, or both.

5. A method of making a nonwoven metal fabric, comprising the steps of: electroplating the surface of a conductive nonwoven fabric with metal under the conditions where the maximum current density is not less than 10 A/dm$^2$ and the metal concentration in a plate bath is not more than 120 g/L,; and sintering the resultant product in a reducing atmosphere, thereby removing the conductive nonwoven fabric therefrom.

6. A method of making a nonwoven metal fabric according to claim 5, wherein said conductive nonwoven fabric is a carbon nonwoven fabric or an organic fiber nonwoven fabric whose surface is treated to have conductivity.

7. A method of making a nonwoven metal fabric according to claim 5, wherein the thickness of said conductive nonwoven fabric is not less than 0.3 mm.

* * * * *